United States Patent
Terwilliger et al.

(10) Patent No.: US 11,124,291 B2
(45) Date of Patent: Sep. 21, 2021

(54) SYSTEM TO PROMOTE ACCELERATED BOUNDARY LAYER INGESTION

(71) Applicant: United Technologies Corporation, Farmington, CT (US)

(72) Inventors: Neil Terwilliger, Meriden, CT (US); Stuart S. Ochs, Coventry, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 323 days.

(21) Appl. No.: 16/219,423

(22) Filed: Dec. 13, 2018

(65) Prior Publication Data
US 2020/0189724 A1 Jun. 18, 2020

(51) Int. Cl.
| | | |
|---|---|---|
| *B64C 21/08* | (2006.01) | |
| *B64C 1/16* | (2006.01) | |
| *B64C 21/06* | (2006.01) | |
| *B64D 27/20* | (2006.01) | |
| *B64D 33/02* | (2006.01) | |

(52) U.S. Cl.
CPC ............... *B64C 21/08* (2013.01); *B64C 1/16* (2013.01); *B64C 21/06* (2013.01); *B64D 27/20* (2013.01); *B64D 33/02* (2013.01); *B64C 2230/06* (2013.01)

(58) Field of Classification Search
CPC .......... B64C 1/16; B64C 21/02; B64C 21/06; B64C 21/08; B64C 2230/06; B64D 27/20; B64D 33/02
USPC ........................................................ 244/62
See application file for complete search history.

(56) References Cited

U.S. PATENT DOCUMENTS

| | | | | |
|---|---|---|---|---|
| 6,527,224 B2 | 3/2003 | Seidel | | |
| 7,665,689 B2 | 2/2010 | McComb | | |
| 7,861,968 B2* | 1/2011 | Parikh | ..................... | B64D 13/00 |
| | | | | 244/118.5 |
| 8,511,603 B2* | 8/2013 | Blomeley | ............... | B64C 11/00 |
| | | | | 244/49 |
| 8,888,038 B2* | 11/2014 | Bichler | ................... | B64C 39/10 |
| | | | | 244/53 B |
| 2013/0087661 A1* | 4/2013 | Brown | .................... | B64D 29/02 |
| | | | | 244/201 |
| 2017/0240275 A1* | 8/2017 | Evulet | ..................... | B64D 27/20 |
| 2018/0016000 A1 | 1/2018 | Pastouchenko et al. | | |
| 2018/0051716 A1 | 2/2018 | Cheung et al. | | |
| 2018/0086437 A1* | 3/2018 | Pastouchenko | ........ | B64D 27/20 |
| 2018/0209445 A1 | 7/2018 | Tantot | | |

FOREIGN PATENT DOCUMENTS

| | | | |
|---|---|---|---|
| EP | 3333403 A1 | 6/2018 | |
| EP | 3415437 A1 | 12/2018 | |

OTHER PUBLICATIONS

European Search Report Application No. EP19216036; dated Apr. 21, 2020; pp. 8.

\* cited by examiner

*Primary Examiner* — Brady W Frazier
(74) *Attorney, Agent, or Firm* — Cantor Colburn LLP

(57) ABSTRACT

An aircraft is provided and includes fuselage having a nose, a main section aft of the nose and a tail aft of the main section, an engine nacelle partially embedded in the tail and including a boundary layer ingestion (BLI) propulsor with an inlet directly adjacent to the fuselage and a nozzle element disposed upstream from the inlet and configured to accelerate boundary flows flowing toward the interior side of the engine nacelle.

17 Claims, 2 Drawing Sheets

SYSTEM TO PROMOTE ACCELERATED BOUNDARY LAYER INGESTION

BACKGROUND

Exemplary embodiments of the present disclosure relate generally to aircraft and, in one embodiment, to a system to promote accelerated boundary layer ingestion on an aircraft.

Certain aircraft are configured with a fuselage having a nose cone in front and a tail section opposite the nose cone, aerodynamic wings extending outwardly from opposite sides of the fuselage and a tail or rudder assembly at the tail section. The tail or rudder assembly can include a rear pylon and one or more aerodynamic tail wings extending outwardly from the fuselage and the pylon. The aerodynamic wings, the pylon and the aerodynamic tail wings can include controllable surfaces that allow for controlled flight operations.

Propulsive force for the aircraft can be provided by engine nacelles. The engine nacelles can be supported below the aerodynamic wings in some cases or on either side of the fuselage at the tail section in other cases. In the cases in which the engine nacelles are supported on either side of the fuselage at the tail section, the engines ingest air flowing as a boundary layer along the fuselage via the respective fan sections of the engines. While such boundary layer ingestion can provide propulsive efficiency benefits, these benefits are often reduced in practice by adverse effects of inlet distortions on fan efficiencies.

BRIEF DESCRIPTION

According to an aspect of the disclosure, an aircraft is provided and includes fuselage having a nose, a main section aft of the nose and a tail aft of the main section, an engine nacelle partially embedded in the tail and including a boundary layer ingestion (BLI) propulsor with an inlet directly adjacent to the fuselage and a nozzle element disposed upstream from the inlet and configured to accelerate boundary flows flowing toward the interior side of the engine nacelle.

In accordance with additional or alternative embodiments, the propulsor includes a fan in the inlet.

In accordance with additional or alternative embodiments, the nozzle element has a step-wise curvature and an annular curvature about a longitudinal axis of the fuselage.

In accordance with additional or alternative embodiments, the nozzle element includes a forward end, an aft end and an intermediate section interposed between the forward and aft ends and including an inward curvature connected with the forward end and an outward curvature connected with the aft end.

In accordance with additional or alternative embodiments, the forward end is separate from the fuselage by a first average distance, the aft end is separate from the fuselage by a second average distance and the first average distance exceeds the second average distance.

In accordance with additional or alternative embodiments, a vane extends outwardly from the fuselage to support the nozzle element.

In accordance with additional or alternative embodiments, the nozzle element is selectively deployable.

In accordance with additional or alternative embodiments, the nozzle element is stowable within a nozzle element chamber of the fuselage.

In accordance with additional or alternative embodiments, a controller is configured to deploy the nozzle element in accordance with current aircraft conditions.

According to another aspect of the disclosure, a system to promote boundary layer ingestion is provided and includes a boundary layer ingestion (BLI) propulsor inlet, fuselage along which airflows flow as boundary layer airflows toward the BLI propulsor inlet, the fuselage being configured to distort a profile of the boundary layer airflows and a nozzle element disposed upstream from the BLI propulsor inlet and downstream from a distortion of the boundary layer airflows by the fuselage and configured to homogenize the profile of the boundary layer airflows.

In accordance with additional or alternative embodiments, the BLI propulsor inlet includes a fan.

In accordance with additional or alternative embodiments, the nozzle element has a step-wise curvature and an annular curvature about a longitudinal axis of the fuselage.

In accordance with additional or alternative embodiments, the nozzle element includes a forward end, an aft end and an intermediate section interposed between the forward and aft ends and including an inward curvature connected with the forward end and an outward curvature connected with the aft end.

In accordance with additional or alternative embodiments, the forward end is separate from the fuselage by a first average distance, the aft end is separate from the fuselage by a second average distance and the first average distance exceeds the second average distance.

In accordance with additional or alternative embodiments, a vane extends outwardly from the fuselage to support the nozzle element.

In accordance with additional or alternative embodiments, the nozzle element is selectively deployable.

In accordance with additional or alternative embodiments, the nozzle element is stowable within a nozzle element chamber of the curved section.

In accordance with additional or alternative embodiments, a controller is configured to deploy the nozzle element in accordance with current aircraft conditions.

According to another aspect of the disclosure, a system to promote boundary layer ingestion is provided. The system includes a boundary layer ingestion (BLI) propulsor inlet including interior and exterior sides, fuselage along which airflows flow as boundary layer airflows toward the interior and exterior sides of the BLI propulsor inlet, the fuselage being configured to distort a profile of the boundary layer airflows and a nozzle element disposed upstream from the BLI propulsor inlet and downstream from a distortion of the boundary layer airflows by the fuselage. The nozzle element is configured to homogenize the profile of the boundary layer airflows by accelerating the airflows flowing as boundary layer airflows toward the interior side of the BLI propulsor inlet and decelerating the airflows flowing as boundary layer airflows toward the exterior side of the BLI propulsor inlet.

In accordance with additional or alternative embodiments, the nozzle element has a step-wise curvature and an annular curvature about a longitudinal axis of the fuselage.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

As will be described below, a ram nozzle is placed in front of an inlet of a fan of an aircraft engine. The ram nozzle accelerates boundary layer airflows near a fuselage wall and slows other airflows that are more distant from the fuselage wall. The ram nozzle thus effectively provides for a more uniform inflow velocity of the airflows flowing into the inlet of the fan.

Figure 1:
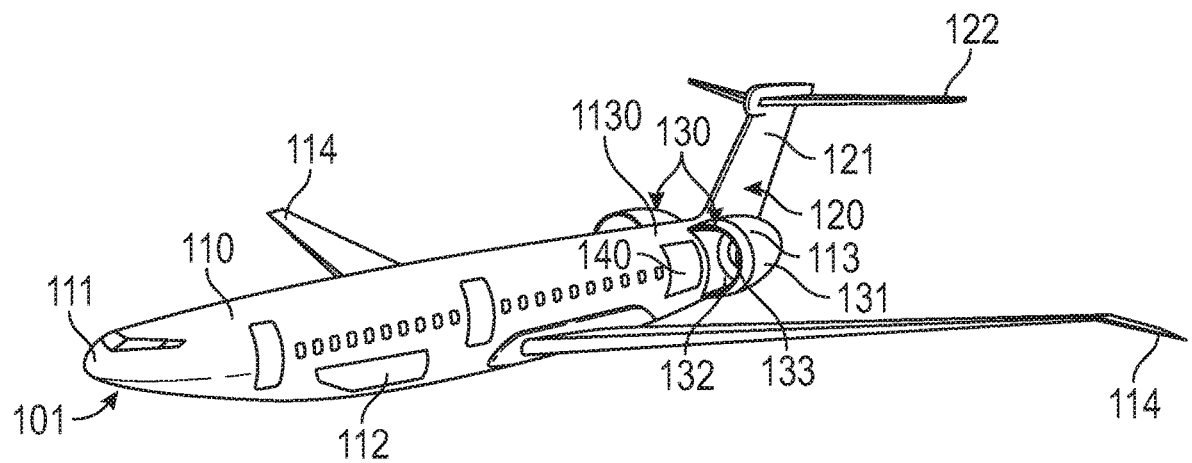
FIG. 1 is a perspective view of an aircraft in accordance with embodiments.
Figure 2:
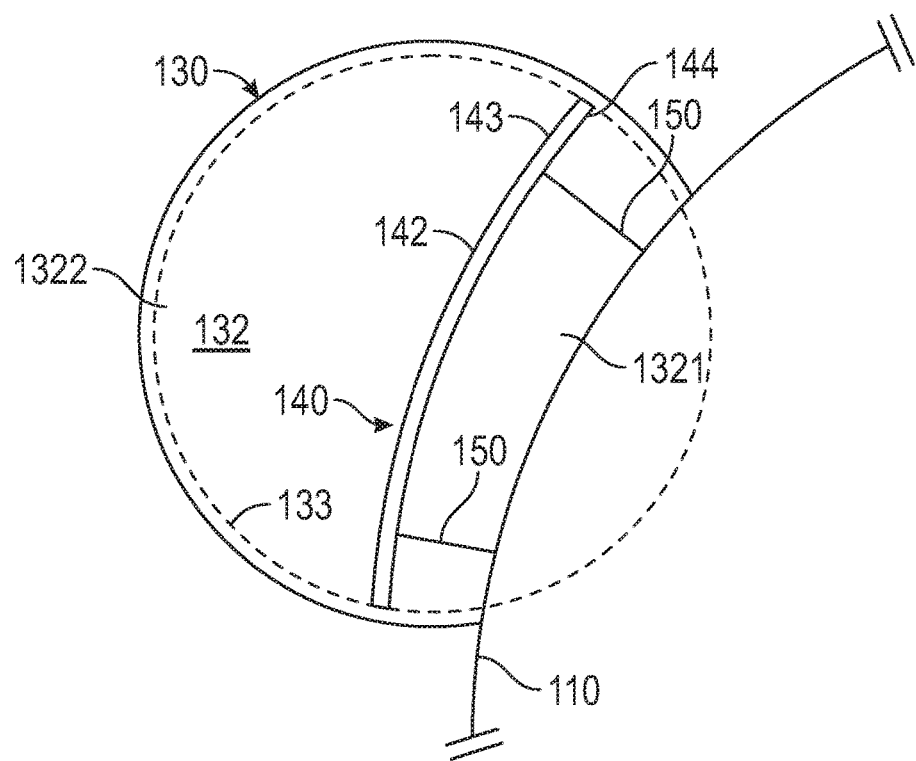
FIG. 2 is an axial view of a propulsor and a nozzle element of the aircraft of FIG. 1 in accordance with embodiments.

With reference to FIGS. 1 and 2, an aircraft 101 is provided and includes fuselage 110. The fuselage 110 has a nose section 111, a main section 112 that is located aft of the nose section 111 and a tail section 113 that is located aft of the main section 112. The aircraft 101 also includes aerodynamic wings 114 extending outwardly from opposite sides of the fuselage 110 at the main section 112 and a tail assembly 120 located at the tail section 113. The tail assembly 120 has a pylon 121 that extends vertically upwardly from the fuselage 110 and aerodynamic tail wings 122 extending outwardly from opposite sides of the pylon 121. The aircraft 101 can further include controllable surfaces on the aerodynamic wings 114, the pylon 121 and the aerodynamic tail wings 122 that can be pivoted in order to facilitate the execution of controlled flight operations.

Figure 4:
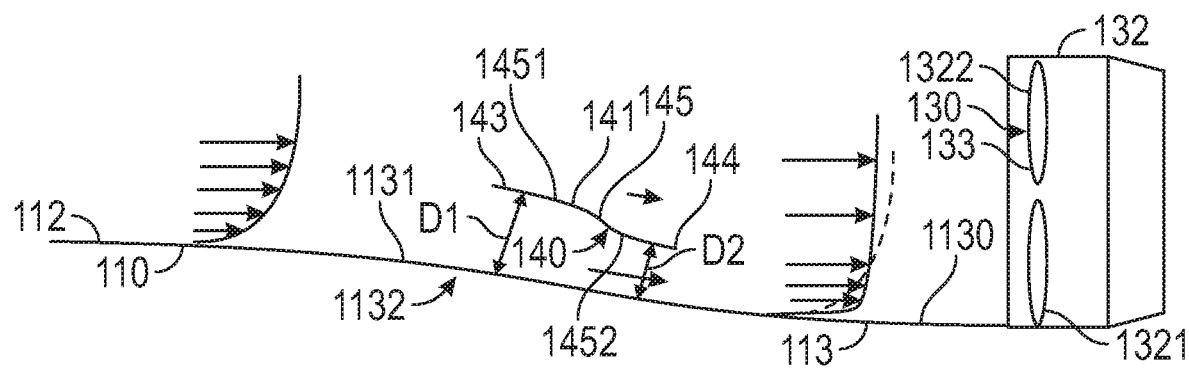
FIG. 4 is a side schematic view of the propulsor and the nozzle of FIGS. 2.

Power to drive ground-based and flight operations for the aircraft 101 is generated within engine nacelles 130. As shown in FIGS. 1 and 4, the engine nacelles 130 are supported at and partially embedded within a rear portion 1130 of the tail section 113 although it is to be understood that this is not required and that the engine nacelles 130 can be supported at and partially embedded within other locations around the aircraft 101. In any case, each engine nacelle 130 includes a boundary layer ingestion (BLI) propulsor 131 with a BLI propulsor inlet 132 and a fan 133 disposed within the BLI propulsor inlet 132.

Figure 3:
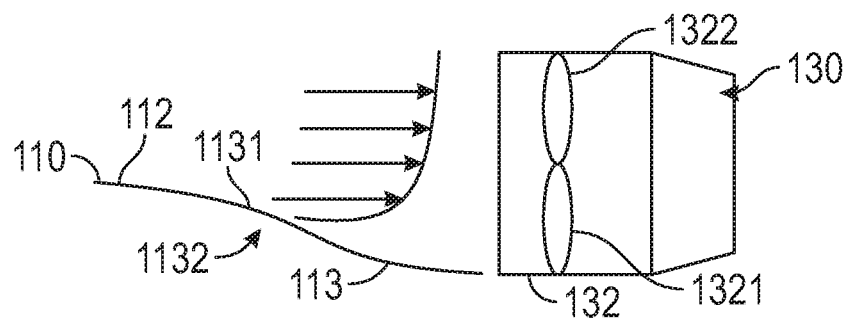
FIG. 3 is a side schematic view of a propulsor of an aircraft lacking a nozzle element.

With continued reference to FIGS. 1 and 2 and with additional reference to FIGS. 3 and 4, the BLI propulsor inlet 132 has an interior side 1321 and an exterior side 1322 and is disposed such that the interior side 1321 is directly adjacent to the fuselage 110 at the tail section 113. At this location, airflows flowing around the aircraft 101 flow along the fuselage 110 during ground-based and flight operations such that the airflows flow past the nose section 111, then past the main section 112 and then past a forward portion 1131 of the tail section 113 before they enter the BLI propulsor inlet 132 as boundary layer airflows.

In accordance with embodiments, due to the curvature of the fuselage 110 from the main section 112 to the tail section 113 (see FIGS. 1, 3 and 4), the fuselage 110 at the main section 112 at least partially obscures the span of the fan 133 at the interior side 1321 of the propulsor inlet 132 to the airflows flowing around the aircraft 101 (see FIG. 2). A curvature 1132 (see FIG. 4) of the forward portion 1131 of the tail section 113 curves inwardly toward the interior side 1321 of the propulsor inlet 132 to clear the fuselage 110 from the span of the fan 133 at the interior side 1321 of the BLI propulsor inlet 132.

As shown in FIG. 3, in certain aircraft designs, viscous scrubbing of the airflows along the fuselage 110 and, to a lesser extent, the curvature 1132 of the forward portion 1131 of the tail section 113 lead to boundary layer airflows closest to the fuselage 110 having reduced velocities as compared to the boundary layer airflows more distant from the fuselage 110 (in some or all cases, the viscous scrubbing has a substantially greater effect of the boundary layer airflows than the curvature 1132). These factors lead to a distortion of a profile of the boundary layer airflows. As a result, the BLI propsulor inlet 132 can receive non-uniform airflows and potential benefits of boundary layer airflow ingestion are reduced due to non-optimized angles of attack for the fan 133 and correspondingly decreased efficiencies.

In accordance with embodiments and, as shown in FIGS. 1, 2 and 4, the aircraft 101 further includes a nozzle element 140. The nozzle element 140 is disposed at the forward portion 1131 of the tail section 113 usream from the BLI propulsor inlet 132 and downstream from the location(s) of he fuselage 110 where the distortion of the boundary layer profile occurs. In this position, the nozzle element 140 is configured to homogenize the profile of the boundary layer airflows by accelerating those boundary layer airflows that flow toward the interior side 1321 of the BLI propsulor inlet 132 and, in some cases, to decelerate those boundary layer airflows that flow toward the exterior side 1322 of the BLI propulsor inlet 132. The BLI propsulor inlet 132 thus receives more uniform airflows and potential benefits of boundary layer airflow ingestion are restored, maintained or increased due to more optimized angles of attack for the fan 133 and correspondingly increased efficiencies.

As shown in FIGS. 2 and 4, the nozzle element 140 has a step-wise curvature 141 (see FIG. 3) toward the forward portion 1131 of the tail section 113 and has an annular curvature 142 (see FIG. 2) about a longitudinal axis A (see FIG. 1) of the fuselage 110. In greater detail, the nozzle element 140 includes a forward end 143, an aft end 144 and an intermediate section 145 that is interposed between the forward end 143 and the aft end 144. The intermediate section 145 includes an inward curvature 1451, which is connected with the forward end 143, and an outward curvature 1452, which is connected with the aft end 144, to define the step-wise curvature 141.

The nozzle element 140 extends axially along the fuselage 110 at the tail section 113 and has an axial curvature that generally mimics the tapering the fuselage 110 at the tail section 113. Nevertheless, the forward end 143 is separate from the forward portion 1131 of the tail section 113 by a first average distance D1, the aft end 144 is separate from the forward portion 1131 of the tail section 113 by a second average distance D2 and the first average distance D1 exceeds the second average distance D2.

Figure 5:
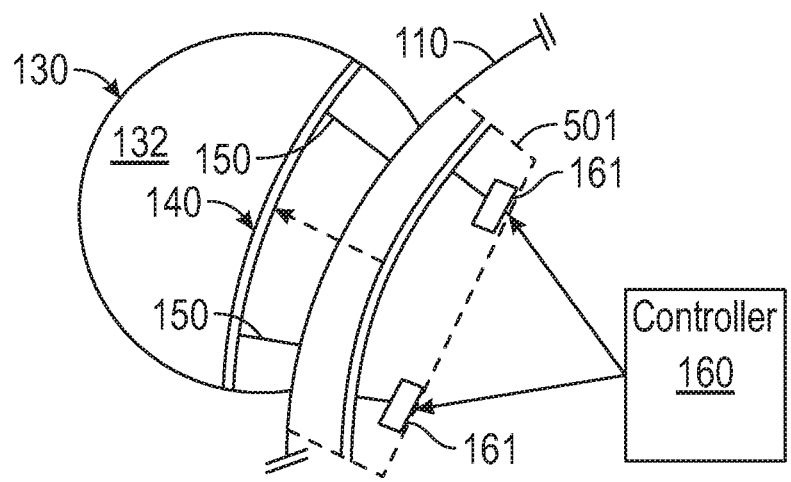
FIG. 5 is an axial view of the propulsor and the nozzle element of the aircraft of FIG. 1 with nozzle element stowage and deployment capability in accordance with further embodiments.

With reference to FIG. 2 and additional reference to FIG. 5, one or more vanes 150 extend outwardly from the fuselage 110 at the tail section 113 to support the nozzle element 140. With these vanes 150, the nozzle element 140 can be deployed permanently or semi-permanently as shown in FIG. 2 or can be selectively deployable as shown in FIG. 5. In the latter case, the nozzle element 140 can be stowed within a nozzle element chamber 501 of the fuselage 110 at the tail section 113 and deployed in accordance with current aircraft or ground-based or flight operation conditions (i.e., when a BLI propulsor efficiency boost is desired from improved boundary layer airflow ingestion by the BLI propulsor inlet 132 resulting from the deployment of the nozzle element 140).

Selective deployment of the nozzle element 140 can be executed by a controller 160 that is coupled to servo elements 161. The servo elements 161 are configured to position the one or more vanes 150 such that the nozzle element 140 is stowed or deployed. The controller 160 is configured to control the stowage and deployment of the nozzle element 140 in accordance with current aircraft or current ground-based or flight operation conditions.

Benefits of the features described herein are the provision of a ram nozzle that can simultaneously accelerate certain boundary layer airflows and decelerate the bulk of the fan inlet airflows to thereby provide for more uniform boundary layer ingestion at the BLI propulsor inlet, to allow a more optimized angle of attack and to provide for higher overall fan efficiency while retaining all of the propulsive efficiency benefits of boundary layer ingestion. These benefits will outweigh pressure losses due to the additional geometry of the ram nozzle.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An aircraft, comprising:
   a fuselage having a nose, a main section aft of the nose and a tail aft of the main section;
   an engine nacelle partially embedded in the tail and comprising a boundary layer ingestion (BLI) propulsor with an inlet directly adjacent to the fuselage; and
   a curved sheet element disposed upstream from the inlet and configured to accelerate boundary layer flows flowing toward an interior side of the engine nacelle,
   wherein the curved sheet element has a step-wise curvature and an annular curvature about a longitudinal axis of the fuselage.

2. The aircraft according to claim 1, wherein the propulsor comprises a fan in the inlet.

3. The aircraft according to claim 1, wherein the curved sheet element comprises:
   a forward end;
   an aft end; and
   an intermediate section interposed between the forward and aft ends and comprising an inward curvature connected with the forward end and an outward curvature connected with the aft end.

4. The aircraft according to claim 3, wherein the forward end is separated from the fuselage by a first average distance, the aft end is separated from the fuselage by a second average distance and the first average distance exceeds the second average distance.

5. The aircraft according to claim 1, further comprising a vane extending outwardly from the fuselage to support the curved sheet element.

6. The aircraft according to claim 1, wherein the curved sheet element is selectively deployable.

7. The aircraft according to claim 6, wherein the curved sheet element is stowable within a curved sheet element chamber of the fuselage.

8. The aircraft according to claim 6, further comprising a controller configured to deploy the curved sheet element in accordance with current aircraft conditions.

9. A system to promote boundary layer ingestion, the system comprising:
   a boundary layer ingestion (BLI) propulsor inlet;
   a fuselage along which airflows flow as boundary layer airflows toward the BLI propulsor inlet, the fuselage being configured to distort a profile of the boundary layer airflows; and
   a curved sheet element disposed upstream from the BLI propulsor inlet and downstream from a distortion of the boundary layer airflows by the fuselage and configured to homogenize the profile of the boundary layer airflows,
   wherein the curved sheet element has a step-wise curvature and an annular curvature about a longitudinal axis of the fuselage.

10. The system according to claim 9, wherein the BLI propulsor inlet comprises a fan.

11. The system according to claim 9, wherein the curved sheet element comprises:
    a forward end;
    an aft end; and
    an intermediate section interposed between the forward and aft ends and comprising an inward curvature connected with the forward end and an outward curvature connected with the aft end.

12. The aircraft according to claim 11, wherein the forward end is separated from the fuselage by a first average distance, the aft end is separated from the fuselage by a second average distance and the first average distance exceeds the second average distance.

13. The system according to claim 9, further comprising a vane extending outwardly from the fuselage to support the curved sheet element.

14. The system according to claim 9, wherein the nozzle curved sheet element is selectively deployable.

15. The system according to claim 14, wherein the nozzle curved sheet element is stowable within a curved sheet element chamber of the curved section.

16. The system according to claim 14, further comprising a controller configured to deploy the curved sheet element in accordance with current aircraft conditions.

17. A system to promote boundary layer ingestion, the system comprising:
- a boundary layer ingestion (BLI) propulsor inlet comprising interior and exterior sides;
- a fuselage along which airflows flow as boundary layer airflows toward the interior and exterior sides of the BLI propulsor inlet, the fuselage being configured to distort a profile of the boundary layer airflows; and
- a curved sheet element disposed upstream from the BLI propulsor inlet and downstream from a distortion of the boundary layer airflows by the fuselage,
- the curved sheet element being configured to homogenize the profile of the boundary layer airflows by accelerating the airflows flowing as boundary layer airflows toward the interior side of the BLI propulsor inlet and decelerating the airflows flowing as boundary layer airflows toward the exterior side of the BLI propulsor inlet,
- wherein the curved sheet element has a step-wise curvature and an annular curvature about a longitudinal axis of the fuselage.

\* \* \* \* \*